Figure 1:
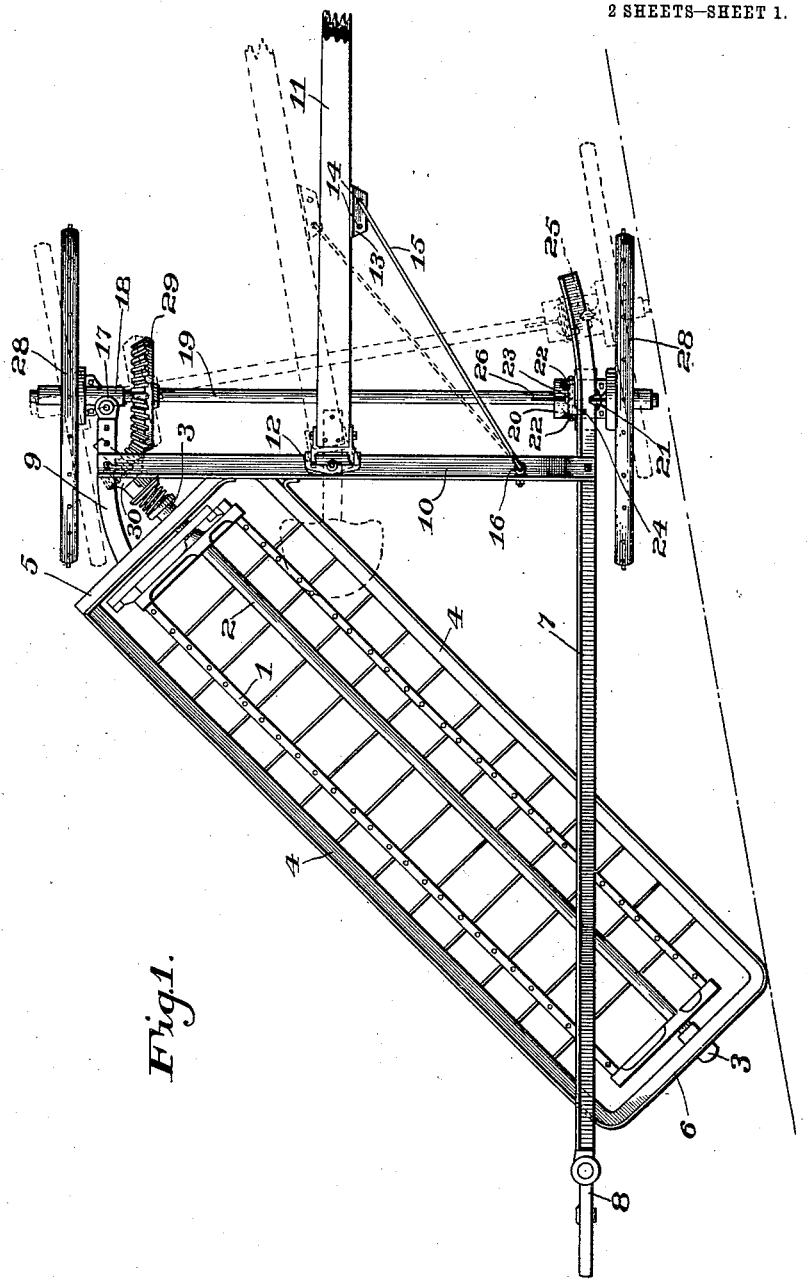

P. RANDALL.
SIDE DELIVERY RAKE.
APPLICATION FILED APR. 29, 1911.

1,009,095.

Patented Nov. 21, 1911.

2 SHEETS—SHEET 1.

Witnesses:
C. C. Palmer
F. W. Hofmeister

Inventor.
Parke Randall.
By E. W. Burgess
Attorney.

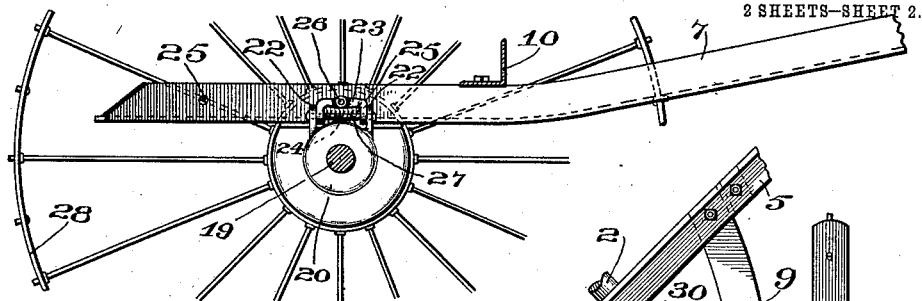
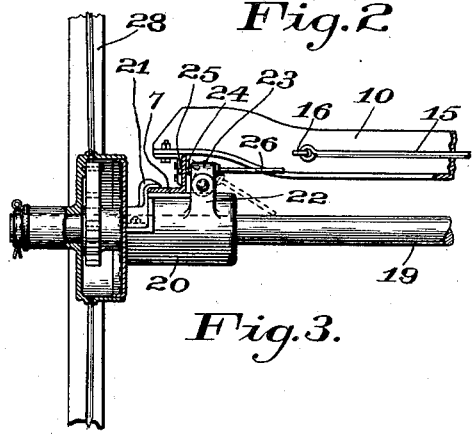
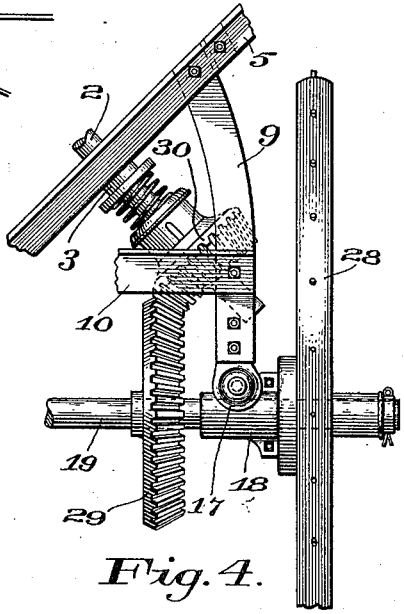
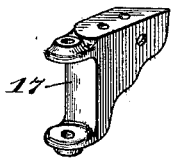
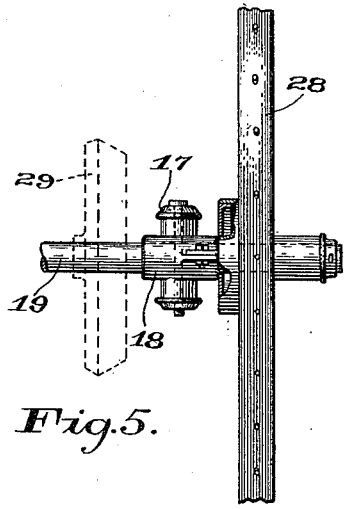

UNITED STATES PATENT OFFICE.

PARKE RANDALL, OF ROCK FALLS, ILLINOIS, ASSIGNOR TO INTERNATIONAL HARVESTER COMPANY, A CORPORATION OF NEW JERSEY.

SIDE-DELIVERY RAKE.

1,009,095.  Specification of Letters Patent.  Patented Nov. 21, 1911.

Application filed April 29, 1911. Serial No. 624,016.

*To all whom it may concern:*

Be it known that I, PARKE RANDALL, a citizen of the United States, residing at Rock Falls, in the county of Whiteside and State of Illinois, have invented certain new and useful Improvements in Side-Delivery Rakes, of which the following is a specification.

My invention relates to side delivery rakes, and in particular to means whereby the wheels and axle may be adjusted about a pivotal connection with the frame that supports a raking cylinder in a manner to vary the angle between the axis of the raking cylinder and the line of draft.

It consists in providing a pivotal connection between the bearing box in which one end of the axle is journaled and the rake supporting frame, and a sliding connection between the axle bearing box at the opposite end of the axle and said frame, and means for adjusting the angle of the draft tongue relative to the machine, the object of the invention being to provide means whereby the effective width of the machine may be reduced for convenience in transportation, said means being readily manipulated for the purpose desired and operative to rigidly secure the parts in either position of adjustment. I attain these objects by means of the mechanism illustrated in the accompanying drawings, in which—

Figure 1 is a plan view of a side delivery rake having my invention forming a part thereof; Fig. 2 is a detached detail of part of the rake supporting frame, designed to illustrate the manner of adjusting one end of the axle relative thereto; Fig. 3 is a front elevation of Fig. 2; Fig. 4 is a detail of part of the rake frame and the opposite end of the axle, designed to illustrate their adjustable connection; Fig. 5 is a front elevation of Fig. 4; and Fig. 6 is a detail of part of Figs. 4 and 5.

The same reference characters designate like parts throughout the several views.

1 represents a raking cylinder arranged at an angle relative to the line of draft of the machine and having its shaft 2 journaled in bearings 3 secured to opposite ends of a supporting frame, including side members 4 arranged parallel with the axis of the raking cylinder, and end members 5 and 6 at the front and rear ends of the frame, respectively.

7 represents a longitudinally arranged draft frame member extending rearward above the rear end of the cylinder frame, to which it is secured, and 8 represents a caster wheel attachment supporting its rear end.

9 represents a curved draft frame member having its rear end secured to the raking cylinder supporting frame at its front end, and its opposite end extending forward in the direction of the line of draft of the machine, and 10 represents a transversely arranged draft frame member having its opposite ends secured to members 7 and 8.

11 represents a draft tongue having its rear end pivotally connected with a yoke 12 in a manner permitting the draft tongue to rise and fall at its front end, the yoke being pivotally connected with the member 10 of the draft frame in a manner permitting the tongue to swing laterally relative to the line of draft, and 13 represents a bracket secured to the tongue and provided with openings 14 adapted to receive the hooked end of a tongue brace 15, the opposite end of the brace being flexibly connected with the draft frame member 10 by means of an eye bolt 16, whereby the front end of the brace may be hooked into either opening in the bracket for the purpose of controlling the angle of the tongue relative to the draft frame.

17 represents a yoke member secured to the front end of the curved member 9 of the draft frame, and having its front end pivotally connected with a bearing box 18, in which is journaled one end of an axle 19, the opposite end of the axle being journaled in the bearing box 20, provided with a clip 21, that overlaps one edge of the front end of frame member 7 in a manner to hold the parts together and permit the box to slide along the frame member, the latter being curved concentric with the pivotal axis of the box 18 upon the yoke 17, and 22 represents upwardly projecting ears integral with box 20 upon the opposite side of the draft frame member, 23 a rocking spring-pressed latch member pivotally connected with the ears and having a projecting pintle 24 adapted to be received by openings 25 in the frame member in a manner to secure the axle against a swinging movement.

26 represents a handle forming part of the bracket, and 27 a coiled spring operative to yieldingly hold the latch member in engagement with the frame member.

28 represents the carrying traction wheels journaled upon opposite ends of the axle, and 29 a gear wheel secured to the axle and engaging with a pinion 30 slidably mounted upon the front end of the raking cylinder shaft, the gearing mechanism being a common form of motion transmitting mechanism in the class of machines as indicated.

In machines of the above noted type it is desirable, for transportation purposes, that the width of the machine, as a whole, be reduced to a width not exceeding the length of the axle, as illustrated in Fig. 1 by full lines. When the machine is in raking position the rear end of the raking cylinder and its supporting frame projects beyond the path of the traction wheel and the end of the axle upon that side of the machine, but when the axle is moved forward about its pivotal connection and the angle of the draft tongue with the draft frame changed, as indicated by dotted lines, the effective width of the machine is not greater than the length of the axle.

What I claim as my invention, and desire to secure by Letters Patent, is:

1. In a side delivery hay rake, the combination of a draft frame including forwardly projecting frame members at opposite sides of the machine and a transverse member connecting the forward ends of said side members, a rearwardly inclined raking cylinder supported by said draft frame, a driving axle pivotally connected with the forward end of one of said side frame members and slidably connected with the front end of the other side frame member, a draft tongue pivotally connected with said transverse frame member in a manner permitting it to rise and fall at its front end, and means whereby the angle of said tongue with said draft frame may be regulated in a lateral direction.

2. In a side delivery hay rake, the combination of a draft frame including forwardly projecting frame members at opposite sides of the machine and a transverse member having its opposite end secured to the front ends of said side members, a rearwardly inclined raking cylinder supported by said draft frame, a driving axle, a bearing block in which said axle is journaled, said bearing block being pivotally connected with the front end of one of said side frame members, the forward end of the opposite side frame member being formed concentric with the axis of the pivotal connection of the bearing block, a bearing block having the opposite end of said axle journaled therein, said bearing block connected with the concentric portion of said oppositely disposed draft frame member in a slidable manner, releasable means for sliding said bearing block in various positions of adjustment thereon, and a draft tongue pivotally connected with said draft frame in a manner permitting it to rise and fall at its front end, and means for adjusting the forward end of said tongue laterally relative to said draft frame.

3. In a side delivery hay rake, the combination of a draft frame including forwardly projecting frame members at opposite sides of the machine and a transverse member having the opposite ends thereof secured to the front ends of said side frame members, a rearwardly inclined raking cylinder supported by said draft frame, a driving axle, a bearing box having said axle journaled therein, a coupling member secured to the front end of one of said side frame members, a pivotal connection between said coupling member and said bearing box, the front end of the side member of the draft frame at the opposite side of the machine being formed concentric with the axis of said coupling member, a bearing block slidably mounted upon the concentric portion of said side frame member and having the opposite end of said axle journaled therein, a spring-pressed latch member operative to secure said bearing block in various positions upon said side frame member, a draft tongue pivotally connected with said draft frame in a manner permitting it to rise and fall at its front end and swing laterally relative to said draft frame, a bracket secured to said draft tongue and having openings therein spaced apart in the direction of the line of draft of the machine, and a tongue brace member having a hook at its forward end adapted to be received by said openings and its rear end flexibly connected with the draft frame.

PARKE RANDALL.

Witnesses:
S. M. MINGLE,
ED MOWRY.